United States Patent
Kasai et al.

(10) Patent No.: US 10,112,526 B2
(45) Date of Patent: Oct. 30, 2018

(54) DEVICE AND METHOD FOR CONTROLLING LIGHT DISTRIBUTION OF VEHICLE HEADLIGHT

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Hajime Kasai, Kariya (JP); Tatsuya Takagaki, Nisshin (JP); Kazuhiko Nakashima, Miyoshi (JP)

(73) Assignees: DENSO CORPORATION, Kariya, Aichi-pref. (JP); TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 99 days.

(21) Appl. No.: 14/394,444

(22) PCT Filed: Apr. 17, 2013

(86) PCT No.: PCT/JP2013/061390
§ 371 (c)(1),
(2) Date: Oct. 14, 2014

(87) PCT Pub. No.: WO2013/157575
PCT Pub. Date: Oct. 24, 2013

(65) Prior Publication Data
US 2015/0062937 A1  Mar. 5, 2015

(30) Foreign Application Priority Data
Apr. 17, 2012 (JP) ................. 2012-094069

(51) Int. Cl.
| H04N 7/18 | (2006.01) |
| B60Q 1/08 | (2006.01) |
| B60Q 1/12 | (2006.01) |
| B60Q 1/14 | (2006.01) |
| B60Q 1/16 | (2006.01) |

(52) U.S. Cl.
CPC ............... *B60Q 1/085* (2013.01); *B60Q 1/12* (2013.01); *B60Q 1/143* (2013.01); *B60Q 1/16* (2013.01);
(Continued)

(58) Field of Classification Search
CPC ........ B60Q 1/04; B60Q 1/12; B60Q 2300/41; B60T 7/22
(Continued)

(56) References Cited

U.S. PATENT DOCUMENTS

2005/0027419 A1* 2/2005 Horii ...................... B60Q 1/12
701/49
2005/0253738 A1* 11/2005 Kobayashi ............. B60Q 1/085
340/988
(Continued)

FOREIGN PATENT DOCUMENTS

| DE | 102008060949 A1 | 9/2009 |
| DE | 102010021944 A1 | 12/2011 |

(Continued)

OTHER PUBLICATIONS

International Search Report (in Japanese with English Translation) for PCT/JP2013/061390, dated Jul. 23, 2013; ISA/JP.
(Continued)

*Primary Examiner* — Sathyanaraya V Perungavoor
*Assistant Examiner* — Peet Dhillon
(74) *Attorney, Agent, or Firm* — Harness, Dickey & Pierce, P.L.C.

(57) ABSTRACT

A light distribution control apparatus for the headlights of a vehicle acquires positional information of a forward vehicle from a forward position sensor detects a turn angle of the own vehicle after a time point at which the forward position sensor detects conditions ahead of the own vehicle, based on signals acquired from a behavior sensor that detects the
(Continued)

behavior of the own vehicle corrects the positional information of the forward vehicle based on the detected turn angle, and controls the light distribution of the headlights of the own vehicle based on the corrected positional information of the forward vehicle. The light distribution control apparatus is capable of reducing tracking delays in light distribution.

6 Claims, 5 Drawing Sheets (52) U.S. Cl.
CPC .. *B60Q 2300/056* (2013.01); *B60Q 2300/112* (2013.01); *B60Q 2300/122* (2013.01); *B60Q 2300/322* (2013.01); *B60Q 2300/41* (2013.01)

(58) Field of Classification Search
USPC .............. 348/148; 701/96, 49; 362/465, 466
See application file for complete search history.

(56) References Cited

U.S. PATENT DOCUMENTS

| 2009/0269511 | A1 | 10/2009 | Zhamu et al. | |
|---|---|---|---|---|
| 2009/0279317 | A1 | 11/2009 | Tatara | |
| 2010/0070151 | A1* | 3/2010 | Sonoda | B60T 7/22 701/96 |
| 2010/0134011 | A1* | 6/2010 | Kobayashi | B60Q 1/085 315/82 |
| 2013/0242100 | A1* | 9/2013 | Seki | B60Q 1/04 348/148 |
| 2013/0294100 | A1* | 11/2013 | Ishizaki | B60Q 1/143 362/465 |

FOREIGN PATENT DOCUMENTS

| JP | H11235948 A | 8/1999 |
|---|---|---|
| JP | 2006021631 A | 1/2006 |
| JP | 2007-112280 | 5/2007 |
| JP | 2009-227088 | 10/2009 |
| JP | 2009269511 A | 11/2009 |
| JP | 2011-255826 | 12/2011 |

OTHER PUBLICATIONS

Written Opinion for PCT/JP2013/061390, dated Jul. 23, 2013; ISA/JP.
International Preliminary Report on Patentability and Written Opinion dated Oct. 30, 2014 in corresponding PCT Application No. PCT/JP2013/061390.

* cited by examiner

DEVICE AND METHOD FOR CONTROLLING LIGHT DISTRIBUTION OF VEHICLE HEADLIGHT

CROSS REFERENCE TO RELATED APPLICATIONS

This application is a U.S. National Phase Application under 35 U.S.C. 371 of International Application No. PCT/JP2013/061390 filed on Apr. 17, 2013 and published in Japanese as WO 2013/157575 A1 on Oct. 24, 2013. This application is based on and claims the benefit of priority from Japanese Patent Application No. 2012-094069 filed Apr. 17, 2012. The entire disclosures of all of the above applications are incorporated herein by reference.

TECHNICAL FIELD

The present invention relates to a light distribution control apparatus for the headlights of a vehicle and a method that are used in a vehicle headlight control system.

BACKGROUND ART

Conventionally, a technology is known in which the position of a forward vehicle in relation to an own vehicle is detected. Based on the position, the light distribution areas of the headlights of the own vehicle is controlled (for example, refer to PTL 1).

CITATION LIST

Patent Literature

[PTL 1] JP-A-2006-21631

SUMMARY OF INVENTION

Technical Problem

However, in the conventional technology, the position of the forward vehicle in relation to the own vehicle at a certain time point Ta is detected at a time point Tb=Ta+ΔTa that is later than the time point Ta. Control of the light distribution areas based on the detected position is actualized at Tc=Tb+ΔTb that is even later than the time point Tb.

Therefore, the light distribution areas based on the positional relationship between the own vehicle and the forward vehicle at time point Ta, which is already in the past, is actualized at time point Tc. In some cases, a situation may occur in which the light distribution is unsuitable for the positional relationship between the own vehicle and the forward vehicle at time point Tc. A phenomenon such as this is referred to as tracking delay in light distribution.

In light of the above-described issues, an object of the present invention is to reduce tracking delays in light distribution, in a technology in which the position of a forward vehicle in relation to an own vehicle is detected and light distribution areas of the headlights of the own vehicle are controlled based on the position.

Solution to Problem

To achieve the above-described object, the present application provides, as a typical example, a light distribution control apparatus for headlights. The light distribution control apparatus includes: a positional information acquiring unit (ECU 16, step 110) that acquires positional information of a forward vehicle of an own vehicle from a forward position sensor (12) that detects conditions ahead of the own vehicle and outputs the positional information of the forward vehicle; a correcting unit (ECU 16, step 120) that, based on signals acquired from a behavior sensor (14, 15) that detects behavior of the own vehicle, detects a turn angle (α) of the own vehicle after a time point (t4) at which the forward position sensor (12) detects the conditions ahead of the own vehicle, and corrects the acquired positional information of the forward vehicle based on the detected turn angle; and a light distribution control unit (ECU 15, step 130, step 140) that controls light distribution of headlights (11) of the own vehicle based on the positional information of the forward vehicle corrected by the correcting unit.

In the light distribution control apparatus configured as described above, the ECU 16 acquires the positional information of the forward vehicle from the forward position sensor (12). In addition, the ECU 16 detects the turn angle (α) of the own vehicle after a time point (t4) at which the forward position sensor (12) detects the conditions ahead of the own vehicle, based on the signals acquired from the behavior sensor (14, 15) that detects the behavior of the own vehicle. The ECU 16 corrects the acquired positional information of the forward vehicle based on the detected turn angle. As a result tracking delays in light distribution can be reduced.

The reference numbers enclosed in parentheses in the above-described "Solution to Problem" represent specific matters used in the embodiment described hereafter, as examples. It goes without saying that the reference numbers are not intended to limit interpretation of the Solution to Problem to the configuration described in the embodiment.

DESCRIPTION OF EMBODIMENTS

Figure 1:
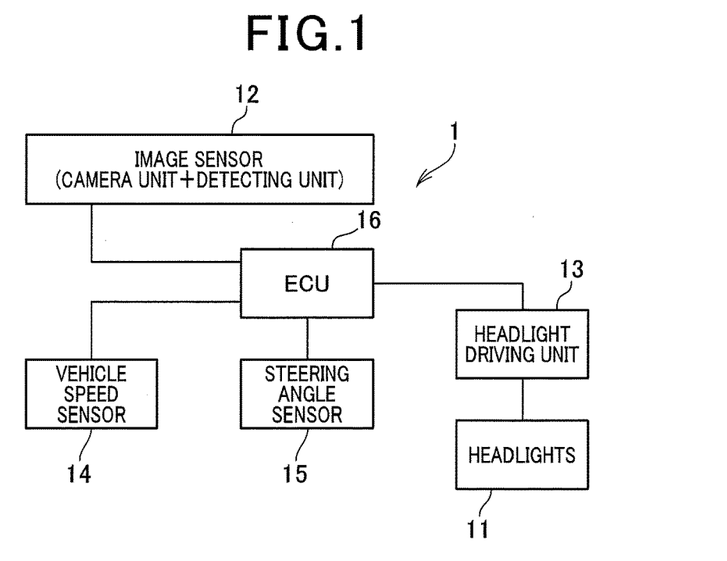
FIG. 1 is a diagram of a configuration of a vehicle headlight control system according to an embodiment of the present invention.

An embodiment of the present invention will hereinafter be described. As shown in FIG. 1, a vehicle headlight control system 1 is mounted in a vehicle. The vehicle headlight control system 1 is a system for controlling two headlights 11 of the vehicle. The vehicle headlight control system 1 includes an image sensor 12 (corresponding to an example of a "forward position sensor" in the scope of claims), a headlight driving unit 13, a vehicle speed sensor 14, a steering angle sensor 15, an engine control unit (ECU) 16, and the like. The vehicle speed sensor 14 and the steering angle sensor 15 correspond to an example of a "behavior sensor" in the scope of claims.

The image sensor 12 includes a camera unit and a detecting unit. The camera unit repeatedly captures an image of the scene (such as the road surface) ahead of the vehicle (for example, periodically at 1/30 seconds cycle). The camera unit successively outputs the captured image (digital image) that is the imaging result to the detecting unit.

The detecting unit successively performs a known detection process (image recognition process) on the captured image outputted from the camera unit. The detecting unit thereby attempts to detect a light source (an object that can be recognized as a vehicle based on luminance of a predetermined value or higher, a shape similar to a predetermined shape, a color similar to a predetermined color, and the like) that appears in the captured image. Then, when one or more light sources are detected in the captured image, the detecting unit identifies the position coordinates (position coordinates within the captured image) of each detected light source. The detecting unit then outputs the acquired position coordinates within the captured image of each light source to the ECU 16 as camera information.

The headlight driving unit 13 is an actuator that controls the light distribution area and the like of the headlights 11 that are each provided on the right side and the left side of the vehicle. The headlight driving unit 13 includes, for each headlight 11, a swivel motor and a shade mechanism motor. The swivel motor changes (in other words, swivels) the irradiation direction (in other words, the light axis direction) of the headlight 11 in the left and right directions of the vehicle. The shade mechanism motor drives a shade mechanism that is provided in the headlight.

The shade mechanism that is provided in each headlight is a known mechanism for blocking some of the light of the headlight 11. For example, a shade mechanism described in JP-A-2009-227088 or JP-A-2009-211963 may be used. The shade mechanism motor drives the position of a shade (a blocking plate) included in the shade mechanism such as this. As a result, the left-side and right-side headlights 11 can each be switched to low beam irradiation, high beam irradiation, or intermediate high beam irradiation.

Figure 2:
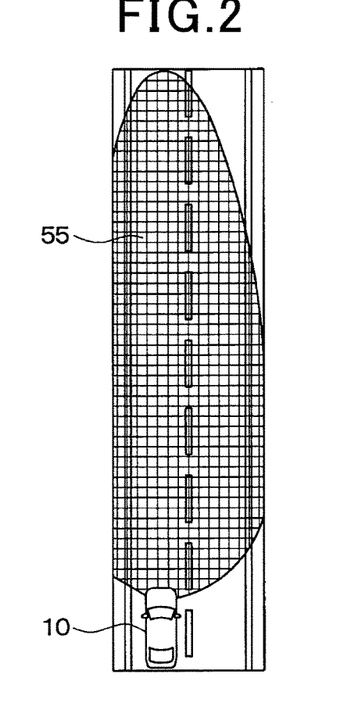
FIG. 2 is a diagram of a light distribution area during left and right high beam irradiation.
Figure 3:
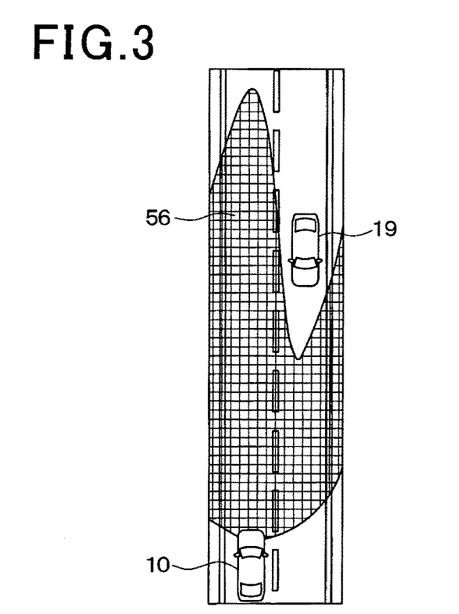
FIG. 3 is a diagram of a light distribution area during left and right intermediate high beam irradiation.
Figure 4:
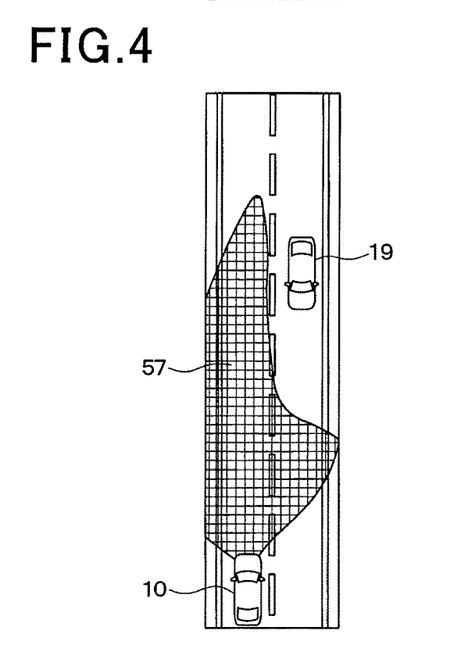
FIG. 4 is a diagram of a light distribution area during left-side high beam and right-side low beam irradiation.

FIG. 2 to FIG. 4 show examples of control modes of the irradiation directions and irradiation areas of the headlights 11 using the shade mechanisms. FIG. 2 shows a light distribution area 55 of the headlights 11 when the left-side headlight 11 and the right-side headlight 11 of a vehicle 10 in which the vehicle headlight control system 1 is mounted are both set to high beam irradiation.

In addition, FIG. 3 shows a light distribution area 56 of the headlights 11 when the left-side headlight 11 and the right-side headlight 11 are both set to intermediate high beam irradiation after recognition of an oncoming vehicle. Furthermore, FIG. 4 shows a light distribution area 57 of the headlights 11 when the right-side headlight 11 is set to low beam irradiation and the left-side headlight 11 is set to high beam irradiation.

During left and right high beams such as that in FIG. 2, the shade mechanisms of the left and right headlights 11 control the position of each shade so that the irradiation area is the widest. During intermediate high beam such as that in FIG. 3, the shade mechanisms of the left and right headlights 11 control the position of each shade so that the light distribution area of each headlight 11 is partially blocked in relation to the light distribution area during high beam. Specifically, the position of each shade is controlled so that, of the light distribution area when the left headlight 11 is set to high beam, the portion on the upper right end is blocked and cut off. In addition, of the light distribution area when the right headlight 11 is set to high beam, the portion on the upper left end is blocked and cut off. As a result of a portion of the light distribution area during high beam being cut off in this way, prevention of glare on an oncoming vehicle 19 can be actualized.

In addition, during left high beam and right low beam such as in FIG. 4, the shade mechanism of the left-side headlight 11 controls the position of the shade so that the light distribution area is the widest. The shade mechanism of the right-side headlight 11 controls the position of the shade so that the light distribution area is narrower than that during intermediate high beam. As a result of the right-side headlight 11 being set to low beam irradiation in this way, light does not shine on the oncoming vehicle 19.

The headlight driving unit 13 controls the shade mechanism motors, thereby switching the irradiation mode between high beam, intermediate high beam, and low beam such as those described above. In addition, the headlight driving unit 13 changes the irradiation directions (in other words, the light axis directions) of the headlights 11 in the left and right directions of the vehicle using the swivel motors, thereby controlling the light distribution areas of both headlights 11.

The vehicle speed sensor 14 successively detects the vehicle speed of the own vehicle. The vehicle speed sensor 14 then outputs a vehicle speed signal indicating the detected vehicle speed to the ECU 16. The steering angle sensor 15 successively outputs a steering angle signal based on the steering angle of the vehicle to the ECU 16. The ECU 16 can identify the steering angle of the own vehicle based on the steering angle signal.

The ECU 16 (corresponding to an example of a "light distribution control apparatus for the headlights of a vehicle" in the scope of claims) is an electronic control unit that includes a microcomputer (processor) and the like. The ECU 16 executes computer programs that are recorded in the ECU 16 in advance, thereby performing various processes for controlling the light distribution areas of the headlights 11. The ECU 16 executes at least each computer program for performing step 110 to step 140, described hereafter.

Operations of the vehicle headlight control system 1, such as that described above, when the headlights 11 are illuminated (such as at night or when passing through a tunnel) will hereinafter be described. First, acquisition timings for various signals by the ECU 16 will be described with reference to FIG. 5.

Figure 5:
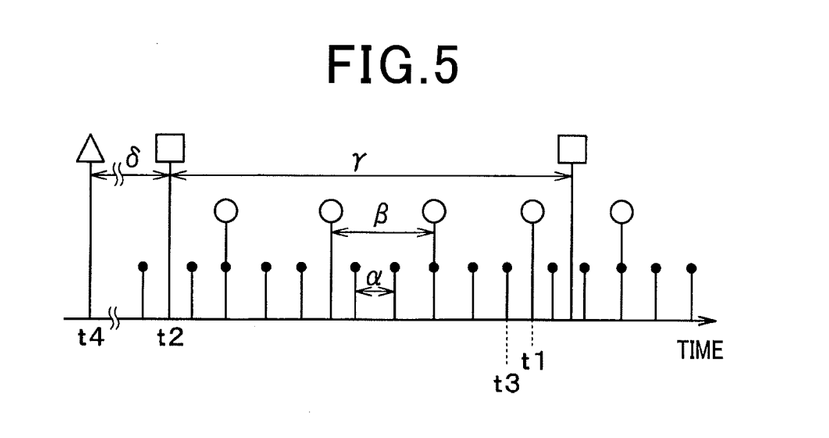
FIG. 5 is a diagram of acquisition timings of signals by an ECU.

The black dots in FIG. 5 indicate the timings at which the vehicle speed signals are acquired from the vehicle speed sensor 14 and the steering angle signals are acquired from the steering sensor 15. In addition, the squares indicate the timings at which the camera information is acquired from the image sensor 12. Furthermore, the white circles indicate the timings at which the ECU 16 performs a process described in FIG. 6.

As shown in FIG. 5, the ECU 16 repeatedly acquires the vehicle speed signals from the vehicle speed sensor 14 and the steering angle signals from the steering angle sensor 15 at a cycle α. In addition, the ECU 16 repeatedly performs the process in FIG. 6 at cycle β which is longer than the above-described cycle α. Furthermore, the ECU 16 acquires the camera information from the image sensor 12 at a cycle γ which is longer than the above-described cycle β.

Here, an operation when the ECU 16 performs the process in FIG. 6 at a certain time point t1 will be described. The operations when the ECU 15 performs the process in FIG. 6 at other time points are also basically the same as the operation at time point t1.

Figure 6:
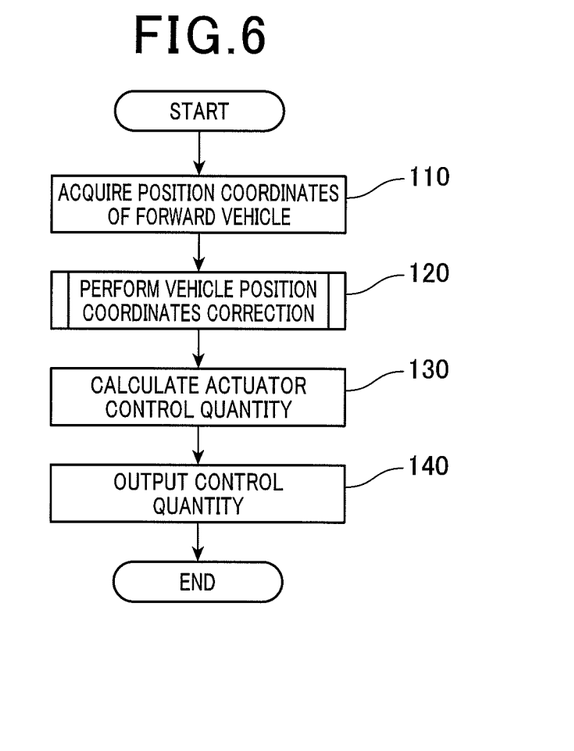
FIG. 6 is a flowchart of a process performed by the ECU.

First, when the ECU 16 starts the process in FIG. 6 at time t1, first, at step 110, the ECU 16 acquires the position coordinates of a forward vehicle. Specifically, the ECU 16 reads out the last piece of camera information acquired from the image sensor 12 (specifically, the camera information acquired at time point t2). The ECU 16 extracts the position coordinates of each light source within the captured image from the camera information that has been read out. The ECU 16 sets the extracted position coordinates of each light source as the position coordinates of the forward vehicle.

At subsequent step 120, the ECU 16 performs correction of the position coordinates of the forward vehicle acquired at the immediately previous step 110. Here, the correction of the position coordinates of the forward vehicle will be described in detail with reference to FIG. 7.

Figure 7:
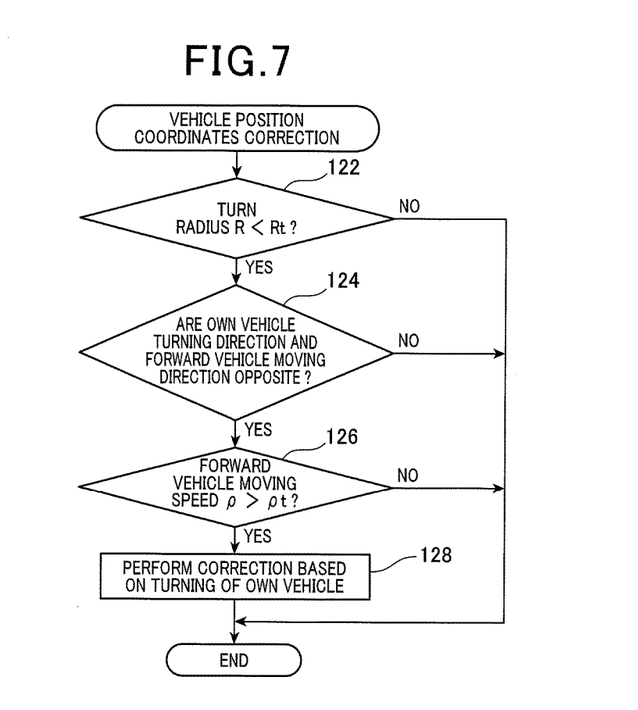
FIG. 7 is a flowchart of the details of a vehicle position coordinates correction process.

First, at step 122, the ECU 16 identifies a turn radius R of the own vehicle. The ECU 16 determines whether or not the identified turn radius is less than a predetermined reference radius Rt. Here, the method for identifying the turn radius R is as follows.

The ECU 16 reads out the last steering angle acquired from the steering angle sensor 15 (specifically, the steering angle signal acquired at time t3) and reads out the last vehicle speed signal acquired from the vehicle speed sensor 14. The ECU 16 identifies the turn radius R of the own vehicle using a known theoretical formula for steady turning, below, based on the absolute value $|\theta|$ of the steering angle $\theta$ based on the steering angle signal that has been read out (an amount obtained by dividing a steering gear ratio with a steering wheel steering angle) and the vehicle speed V of the own vehicle based on the vehicle speed signal that has been read out.

$$R=(1+A \times V^2) \times (L/|\theta|)$$

Here, A represents a stability factor. L represents a wheel base of the own vehicle. Values that have been determined in advance and recorded in a recording medium (such as a read-only memory (ROM)) of the ECU 16 are used as both A and L.

When the own vehicle is traveling straight ahead and when the own vehicle is traveling on a relatively gentle curve, the turn radius R is greater than the reference radius Rt. In such instances, the ECU 16 determines that the turn radius R is greater than the reference radius Rt (NO at step 122) and ends the process in FIG. 7. In other words, in this instance, correction of the position coordinates of the forward vehicle based on the turning of the own vehicle at step 128, described hereafter, is not performed.

When the own vehicle is traveling on a relatively sharp curve, the turn radius R is smaller than the reference radius Rt. In such instances, the ECU 16 determines that the turn radius R is smaller than the reference radius Rt (YES at step 122) and proceeds to step 124.

At step 124, the ECU 16 identifies the turning direction of the own vehicle and the moving direction of a single or a plurality of forward vehicles (relative moving direction with reference to the own vehicle). The ECU 16 determines whether the turning direction and the moving direction are the same or opposite.

Here, the method for identifying the turning direction of the own vehicle is as follows. The ECU 16 reads out the last steering signal acquired by the steering angle sensor 15 (specifically, the steering angle signal acquired at time t3). The ECU 16 identifies the turning direction (right turn or left turn) of the own vehicle based on whether the steering angle $\theta$ based on the steering angle signal that has been read out is positive or negative.

In addition, the moving direction of the forward vehicle (the relative moving direction with reference to the own vehicle) is identified as follows. First, the ECU 16 extracts the position coordinates $(xa_i, ya_i)$ of each light source within the captured image for each light source included in the last piece of camera information acquired from the image sensor 12 (specifically, the camera information acquired at time point t2). Here, i=1, 2, . . . N. N is the number of light sources.

Furthermore, the ECU 16 extracts the position coordinates $(xb_i, yb_i)$ of each light source within the captured image for each light source included in a piece of camera information acquired from the image sensor 12 further before the last piece of camera information (for example, the camera information acquired at time t2−γ that is one cycle prior to time point t2). Here, i=1, 2, . . . N. N is the number of light sources.

Then, the ECU 16 calculates the moving direction of each light source in the captured image from the image sensor 12 based on the position coordinates $(xa_i, ya_i)$ and $(xb_i, yb_i)$. However, the calculation of the moving direction herein refers to the calculation of any of the following three: whether the light source is moving in the rightward direction in the captured image, whether the light source is moving in the leftward direction in the captured image, and whether the light source is moving in neither the rightward direction nor the leftward direction.

At this time, as the method for identifying the same light source between two captured images that have been captured at different times, for example, a method may be used which identifies light sources having the closest position coordinates as the same light source. Other methods may also be used.

Then, the ECU 16 identifies, among the calculated moving directions of the light sources, the moving direction of a forward vehicle corresponding to the light source on the rightmost end and the moving direction of a forward vehicle corresponding to the light source on the leftmost end, based on the moving directions of the light source on the rightmost end and the light source on the leftmost end.

Specifically, when the light source on the rightmost end is moving in the rightward direction, the forward vehicle corresponding to the light source on the rightmost end is identified as moving in the rightward direction. When the light source on the rightmost end is moving in the leftward direction, the forward vehicle corresponding to the light source on the rightmost end is identified as moving in the leftward direction. When the light source on the rightmost end is moving in neither the rightward direction nor the leftward direction, the forward vehicle corresponding to the light source on the rightmost end is identified as moving in neither the rightward direction nor the leftward direction.

In addition, when the light source on the leftmost end is moving in the rightward direction, the forward vehicle corresponding to the light source on the leftmost end is identified as moving in the rightward direction. When the light source on the leftmost end is moving in the leftward direction, the forward vehicle corresponding to the light source on the leftmost end is identified as moving in the leftward direction. When the light source on the leftmost end is moving in neither the rightward direction nor the leftward direction, the forward vehicle corresponding to the light source on the leftmost end is identified as moving in neither the rightward direction nor the leftward direction.

The ECU 16 determines, based on the turning direction of the own vehicle and the moving direction of each forward vehicle that have been identified as described above, whether the turning direction and each moving direction are the same or opposite. When determined that there is not a single forward vehicle that is moving in the direction opposite to the turning direction (NO at step 124), the ECU 16 ends the process in FIG. 7. In other words, in this instance, correction of the position coordinates of the forward vehicle based on the turning of the own vehicle at step 128, described hereafter, is not performed. When determined that one or more forward vehicles are moving in the direction opposite to the turning direction (YES at step 124, the ECU 16 proceeds the process to step 126.

At step 126, the ECU 16 identifies the moving speed ρ of the forward vehicle in the captured image (relative moving speed in relation to the own vehicle). The ECU 16 determines whether or not the moving speed ρ is higher than a predetermined reference speed ρt. Here, the method for identifying the moving speed ρ of the forward vehicle in the captured image is as follows.

First, the ECU 16 extracts the position coordinates ($xa_i$, $ya_i$) of each light source within the captured image for each light source included in the last piece of camera information acquired from the image sensor 12 (specifically, the camera information acquired at time point t2). Furthermore, the ECU 16 extracts the position coordinates ($xb_i$, $yb_i$) of each light source within the captured image for each light source included in a piece of camera information acquired from the image sensor 12 further before the last piece of camera information (for example, the camera information acquired at time t2–γ that is one cycle prior to time point t2).

At this time, as the method for identifying the same light source between two captured images that have been captured at different times, for example, a method may be used which identifies light sources having the closest position coordinates as the same light source. Other methods may also be used.

Then, the ECU 16 calculates the moving speed (amount of movement in the position coordinates of the light source per unit time) of each light source in the captured image from the image sensor 12 based on the position coordinates ($xa_i$, $ya_i$) and ($xb_i$, $yb_i$). Then, the ECU 16 extracts, among the angle moving speeds calculated in this way, a representative moving speed (may be the maximum moving speed, may be an average moving speed, or may be the minimum moving speed). The ECU 16 sets the extracted moving speed as the moving speed of the forward vehicle.

When determined that the moving speed ρ of the forward vehicle in the captured image is the predetermined reference speed ρt or lower (NO at step 126), the ECU 16 ends the process in FIG. 7. In other words, in this instance, correction of the position coordinates of the forward vehicle based on the turning of the own vehicle at step 128, described hereafter, is not performed. When determined that the moving speed ρ is greater than the reference speed ρt (YES at step 126), the ECU 16 proceeds to step 128.

Figure 8:
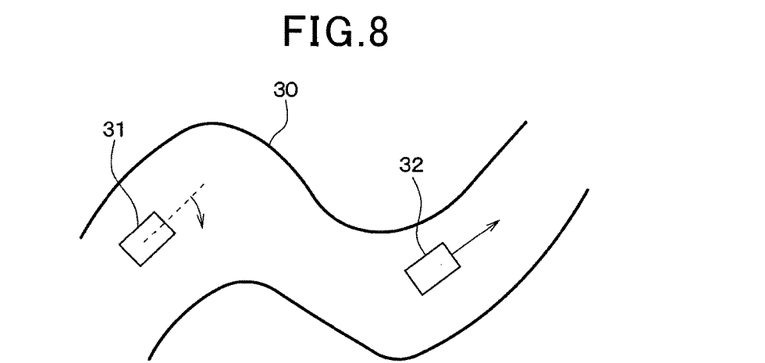
FIG. 8 is a diagram of an example of when an own vehicle 31 is on an S-shaped curve 30.

Here, a typical example in which the process proceeds through steps 122, 124, 126, and 128 will be described with reference to FIG. 8. In FIG. 8, the own vehicle 31 has just entered an S-shaped curve 30. A preceding vehicle 32 is about to leave the S-shaped curve 30.

In an instance such as this, the own vehicle 31 is turning in the rightward direction. The preceding vehicle 32 is moving to the left side from the perspective of the own vehicle 31. The turn radius R of the own vehicle 31 in this instance is smaller than the reference radius Rt. The moving speed ρ of the light source (taillight) of the preceding vehicle 32 in the captured image is higher than the reference speed ρt.

In an example such as this, the ECU 16 determines that the turn radius R of the own vehicle 31 is smaller than the reference radius Rt at step 122 and proceeds to step 124. Then, at step 124, the ECU 16 determines that the left end light source (left taillight of the preceding vehicle 32) and the right end light source (right taillight of the preceding vehicle 32) are moving in the direction (leftward direction) opposite to the turning direction (rightward direction) of the own vehicle 31. Therefore, the ECU 16 determines that the turning direction of the own vehicle and the moving direction of each forward vehicle (relative moving direction with reference to the own vehicle) are opposite. The ECU 16 then proceeds to step 126. At step 126, the ECU 16 determines that the moving speed ρ of the forward vehicle in the captured image is higher than the predetermined reference speed ρt, and proceeds to step 128.

In this way, the determination processes at steps 122, 124, and 126 are, as a whole, also a process for detecting that the own vehicle 31 has just entered the S-shaped curve 30, a detection is made that the preceding vehicle 32 is about to leave the S-shaped curve, and the process proceeds to step 128 when the detection is made. In a situation such as this on the S-shaped curve, the direction of the forward vehicle in relation to the own vehicle at the time of imaging often significantly differs from the current direction of the forward vehicle in relation to the own vehicle.

Figure 9:
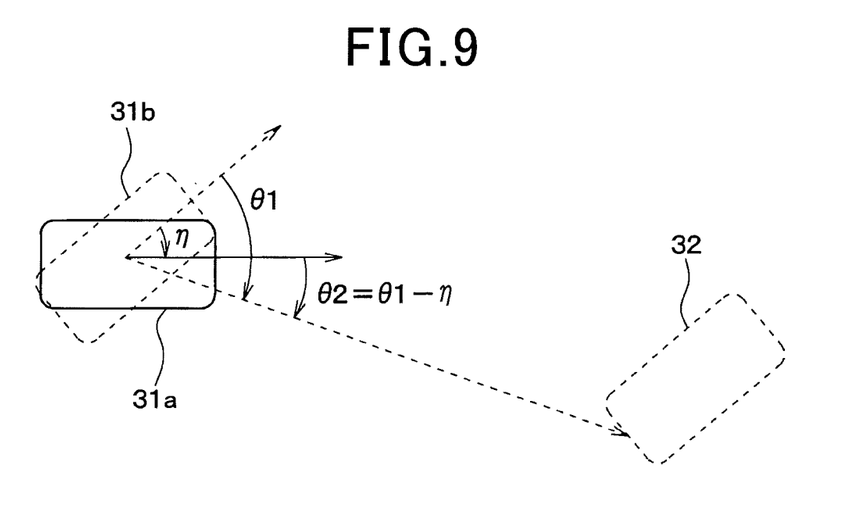
FIG. 9 is a diagram of a correction process based on turning of own vehicles 31 and 31'.

At step 128, the ECU 16 performs correction of the position coordinates of the forward vehicle acquired at the immediately previous step 110, based on the turning on the own vehicle. Specifically, as shown in FIG. 9, the attitude 31a of the own vehicle at current time point t1 and the attitude 31b of the own vehicle at imaging time point t4 (see FIG. 5) of the captured image used to identify the forward vehicle acquired at the immediately previous step 110 are compared. Then, the ECU 16 calculates a change angle η of the direction of the vehicle at the attitude 31a in relation to the attitude 31b.

Here, the imaging time point t4 of the captured image is a time point that is further before the time point t2 at which the camera information has last been acquired from the image sensor 12. A reason for this is, as described above, the image sensor 12 performs the detection process on the captured image. Therefore, the output of the camera information is delayed by a period amounting to the time δ required for the detection process (such as 20 milliseconds). The time δ is longer than the above-described acquisition interval γ of the camera information.

The method for calculating the change angle η is as follows. For example, a value ω×(t1−t4) may be set as the change angle η. The value ω×(t1−t4) is obtained by multiplying elapsed time t1−t4 from the imaging time point t4 to the current time point t1 with the yaw rate ω of the own vehicle. This calculation method presumes that the own vehicle has turned at a fixed yaw rate ω during the elapsed time t1−t4.

In this instance, the yaw rate ω of the own vehicle is calculated based on the steering angle θ and the vehicle speed V. The steering angle θ is based on the last steering angle signal acquired from the steering angle sensor 15 (specifically, the steering angle signal acquired at time t3). The vehicle speed V is based on the last vehicle speed signal acquired from the vehicle speed sensor 14. Specifically, the yaw angle ω is calculated by an expression $\omega=360\times V/(2\times \pi\times R)$ using the turn radius $R=(1+A\times V^2)\times(L/|\theta|)$ calculated as described above.

In addition, the elapsed time from time point t4 to time point t1 is calculated as follows. At time point t2 at which the camera information has last been acquired from the image sensor 12, the time at this time point t2 is stored. At the current time point t1, the difference t1−t2 from the time at the current time point t1 to the stored time at time point t2 is calculated. A value t1−t2+δ that is obtained by time δ being added to the calculated difference t1−t2 is set as the elapsed time t1−t4 from time point t4 to time point t1. The time δ is the amount of time required for the detection process by the image sensor 12. This amount of time is considered to be constant. A value that is recorded in a storage medium of the ECU 16 is used for this amount of time.

Alternatively, the method for calculating the change amount η may be more accurate. Calculation may be performed as follows. In other words, as described above, the elapsed time t1−t4 from time point t4 to time point t1 is calculated. The change angle η may be calculated using the steering angle signals acquired a plurality of times from the steering angle sensor 15 during the elapsed time, and the vehicle speed signals acquired a plurality of times from the vehicle speed sensor 14 during the elapsed time.

For example, at each acquisition time point $t_i$ of the steering angle signals and the vehicle speed signals, the yaw rate $\omega_i$ of the own vehicle at this time point may be calculated based on the steering angle signal and the vehicle speed signal acquired at this time point. The calculated yaw rate at each time point may then be integrated from time point t4 to time point t1, and the integrated result may be set as the change angle η.

Next, the position coordinates of each forward vehicle acquired at the immediately previous step 110 are corrected using the change angle η calculated as described above. Specifically, a value θ1−η that is obtained by subtracting the change angle η amount from the component θ1 of the left and right directions (corresponding to the left and right direction angle of the forward vehicle from the perspective of the own vehicle), among the position coordinates of the forward vehicles, is set as the component of the left and right directions of the position coordinates of the forward vehicle after correction (in other words, the position coordinates in the left and right direction).

A reason for this is as follows. The position coordinates of the forward vehicle acquired at the immediately previous step 110 merely indicates the attitude of the own vehicle and the position of the forward vehicle at time point t4 that is before the current time point t1. At the current point, the attitude of the own vehicle has already changed by the angle η. Therefore, the position coordinates of the forward vehicle reflecting the amount of the change angle η is identified. The movement amount of the forward vehicle from time point t4 to time point t1 can only be obtained as an estimation value based on past detection values. Therefore, according to the present embodiment, the movement amount of the forward vehicle is not reflected in the correction to the position coordinates of the forward vehicle. However, as another example, the movement amount of the forward vehicle may be broadly reflected.

With the above, the vehicle position correction process at step 120 is ended. After step 120, the ECU 16 performs calculation of actuator control quantities at step 130. Specifically, the ECU 16 controls the actuators (the swivel motor and the shade mechanism motor of each headlight 11) based on the position coordinates of the forward vehicle that are the results calculated at step 110 and corrected (or uncorrected) at step 130.

Specifically, when the position coordinates of the forward vehicle cannot be acquired (in other words, when the camera information acquired from the image sensor 12 does not include the position coordinates of a light source), the ECU 16 calculates the control quantity of the shade mechanism motor for each headlight 11 so as to achieve left and right high beams, such as that shown in FIG. 2. Furthermore, the ECU 16 calculates the control quantity of the swivel motor for each headlight 11 so that the irradiation direction of each headlight faces directly ahead of the own vehicle (or an own vehicle position several seconds after, based on the latest steering angle).

In addition, when the position coordinates of the forward vehicle are acquired (in other words, when the camera information acquired from the image sensor 12 includes the position coordinates of a light source), the ECU 16 calculates a center position that is equidistant from the position coordinates on the left end and the position coordinates on the right end (in the case of preceding vehicles, often the position coordinates of the left taillight of the preceding vehicle and the position coordinates of the right taillight), among the position coordinates of the forward vehicle.

When the center position is within a predetermined angle to the left or right from directly in front of the own vehicle, the ECU 16 calculates the control quantity of the swivel motor for each headlight 11 so that the irradiation direction of each headlight faces the center position. In addition, the ECU 16 calculates the control quantity of the shade mechanism motor for each headlight 11 so as to achieve left and right intermediate high beams, such as that shown in FIG. 3.

As a result, prevention of glare on the forward vehicle can be actualized and the periphery of the forward vehicle can be sufficiently illuminated. At this time, as a result of the position coordinates of the forward vehicle being corrected based on the turning of the own vehicle as described above, prevention of glare on the forward vehicle can be performed with further certainty.

When the center position is in a position outside of a predetermined angle to the right from directly in front of the own vehicle, the ECU 16 calculates the control quantity of the swivel motor for each headlight 11 so that the irradiation direction of each headlight faces directly ahead of the own vehicle. In addition, the ECU 16 calculates the control quantity of the shade mechanism motor for each headlight 11 so that the left headlight 11 is high beam and the right headlight 11 is low beam, as shown in FIG. 4.

As a result, prevention of glare on the forward vehicle can be actualized and the periphery of the forward vehicle can be sufficiently illuminated. At this time, as a result of the position coordinates of the forward vehicle being corrected based on the turning of the own vehicle as described above, prevention of glare on the forward vehicle can be performed with further certainty.

Next, at step 140, the ECU 16 controls the shade mechanism motors and the swivel motors to actualize the control quantity of the shade mechanism motor and the control quantity of the swivel motor for each headlight 11 calculated at the immediately previous step 130.

In this way, the light distribution control apparatus for the headlights can detect the turn angle of the own vehicle after the time point (t4) at which the ECU 16 has detected the conditions ahead of the own vehicle to output the positional information of the forward vehicle, based on signals acquired from the behavior sensors (14, 15) that detect the behavior of the own vehicle. The light distribution control apparatus for the headlights can then correct the acquired positional information of the forward vehicle based on the detected turn angle, thereby reducing tracking delays in light distribution.

(Variation Examples)

An embodiment of the present invention is described above. However, the scope of the present invention is not limited only to the above-described embodiment, and encompasses various aspects that can actualize the functions of the invention-identifying features of the present invention. For example, aspects such as the following are also allowed.

(1) For example, according to the above-described embodiment, the acquisition timings of the vehicle speed signals and the steering angle signals are the same. However, the acquisition timings of the vehicle speed signals and the steering angle signals may not be the same. However, even in such instances, the acquisition cycle of the vehicle speed signals and the acquisition cycle α of the steering angle signals are shorter than the acquisition cycle γ of the camera information.

(2) In addition, according to the above-described embodiment, the process at step 126 may be omitted. In other words, when the turning direction of the own vehicle and the moving direction of the forward vehicle are determined to be opposite at step 124, the process at step 128 may be immediately performed.

(3) In addition, according to the above-described embodiment, the process at step 122 may be omitted. In other words, the process at step 120 may proceed directly to the process at step 124.

(4) In addition, according to the above-described embodiment, the processes at all steps 122, 124, and 126 may be omitted. In other words, the process at step 120 may be performed by only step 128. In this instance, correction of the position coordinates of the forward vehicle is performed at all times.

(5) In addition, according to the above-described embodiment, a combination of the vehicle speed sensor 14 and the steering angle sensor 15 is used as the behavior sensor that detects the behavior of the own vehicle. However, other combinations (such as a vehicle speed sensor and a yaw rate sensor) may be used as the behavior sensor, as long as the above-described change angle η of the own vehicle can be identified.

(6) In addition, according to the above-described embodiment, the image sensor 12 that captures the scene ahead of the own vehicle and outputs the camera information (corresponding to the positional information of the forward vehicle) is used as the forward position sensor that detects the conditions ahead of the own vehicle and outputs the positional information of the forward vehicle. However, as the forward position sensor, in addition to the image sensor 12, a laser radar sensor may be used that emits a laser ahead of the own vehicle, detects reflection waves thereof, and thereby outputs the positional information of the forward vehicle.

(Relationship between Embodiment and Scope of Claims)

The computer program stored in the ECU 16 for performing step 110 is an example of a "positional information acquiring unit" in the scope of the claims. The computer program stored in the ECU 16 for performing step 120 is an example of a "correcting unit" in the scope of the claims. The computer program stored in the ECU 16 for performing step 130 and step 140 is an example of a "light distribution control unit" in the scope of the claims.

REFERENCE SIGNS LIST

12: image sensor
14: vehicle speed sensor
15: steering angle sensor

The invention claimed is:

1. A light distribution control apparatus for headlights of a vehicle, the light distribution control apparatus comprising:
   a processor, the processor being configured to:
   acquire positional information of a forward vehicle which is ahead of an own vehicle using a forward position sensor that detects conditions ahead of the own vehicle and output the positional information of the forward vehicle;
   detect a turn angle of the own vehicle in an elapsed time period from a past time point at which the forward position sensor detects the conditions ahead of the own vehicle to a current time point, based on signals acquired from a behavior sensor that detects behavior of the own vehicle, and correct the acquired positional information of the forward vehicle based on the detected turn angle; and
   control light distribution of headlights of the own vehicle based on the positional information of the forward vehicle corrected by the processor.

2. The light distribution control apparatus for headlights of a vehicle according to claim 1, wherein:
   the processor is further configured to:
   detect that after the own vehicle enters an S-shaped curve, the forward vehicle leaves the S-shaped curve, based on the detected turn angle of the own vehicle and the acquired positional information of the forward vehicle; and
   perform correction of the acquired positional information of the forward vehicle when detected that after the own vehicle enters the S-shaped curve, the forward vehicle leaves the S-shaped curve.

3. The light distribution control apparatus for headlights of a vehicle according to claim 1, wherein:
   the light distribution control apparatus for the headlights of a vehicle is a light distribution control apparatus for use in a vehicle headlight control system that includes a forward position sensor that captures an image of a scene ahead of the own vehicle and generates positional information of the forward vehicle based on a captured image resulting from the imaging.

4. A light distribution control method for headlights of a vehicle, the light distribution control method comprising:
   acquiring positional information of a forward vehicle which is ahead of an own vehicle using an image sensor that captures an image of a scene ahead of the own vehicle and outputs the positional information of the forward vehicle;
   acquiring signals related to behavior of the own vehicle from a vehicle speed sensor and a steering angle sensor that detects the behavior of the own vehicle;
   detecting a turn angle of the own vehicle in an elapsed time period from a past time point at which the image sensor captures the image of the scene ahead of the own vehicle to a current time point, based on the acquired signals related to the behavior;
   correcting the acquired positional information of the forward vehicle based on the detected turn angle; and
   controlling light distribution of headlights of the own vehicle based on the corrected positional information of the forward vehicle.

5. The light distribution control method for headlights of a vehicle according to claim 4, further comprising:
  detecting that the own vehicle enters an S-shaped curve and the forward vehicle leaves the S-shaped curve, based on the detected turn angle of the own vehicle and the acquired positional information of the forward vehicle, wherein
  the correcting of the acquired positional information of the forward vehicle is performed when it is detected that the own vehicle enters the S-shaped curve and the forward vehicle leaves the S-shaped curve.

6. The light distribution control apparatus for headlights of a vehicle according to claim 2, wherein:
  the light distribution control apparatus for the headlights of a vehicle is a light distribution control apparatus for use in a vehicle headlight control system that includes a forward position sensor that captures an image of a scene ahead of the own vehicle and generates positional information of the forward vehicle based on a captured image resulting from the imaging.

* * * * *